Patented July 23, 1929.

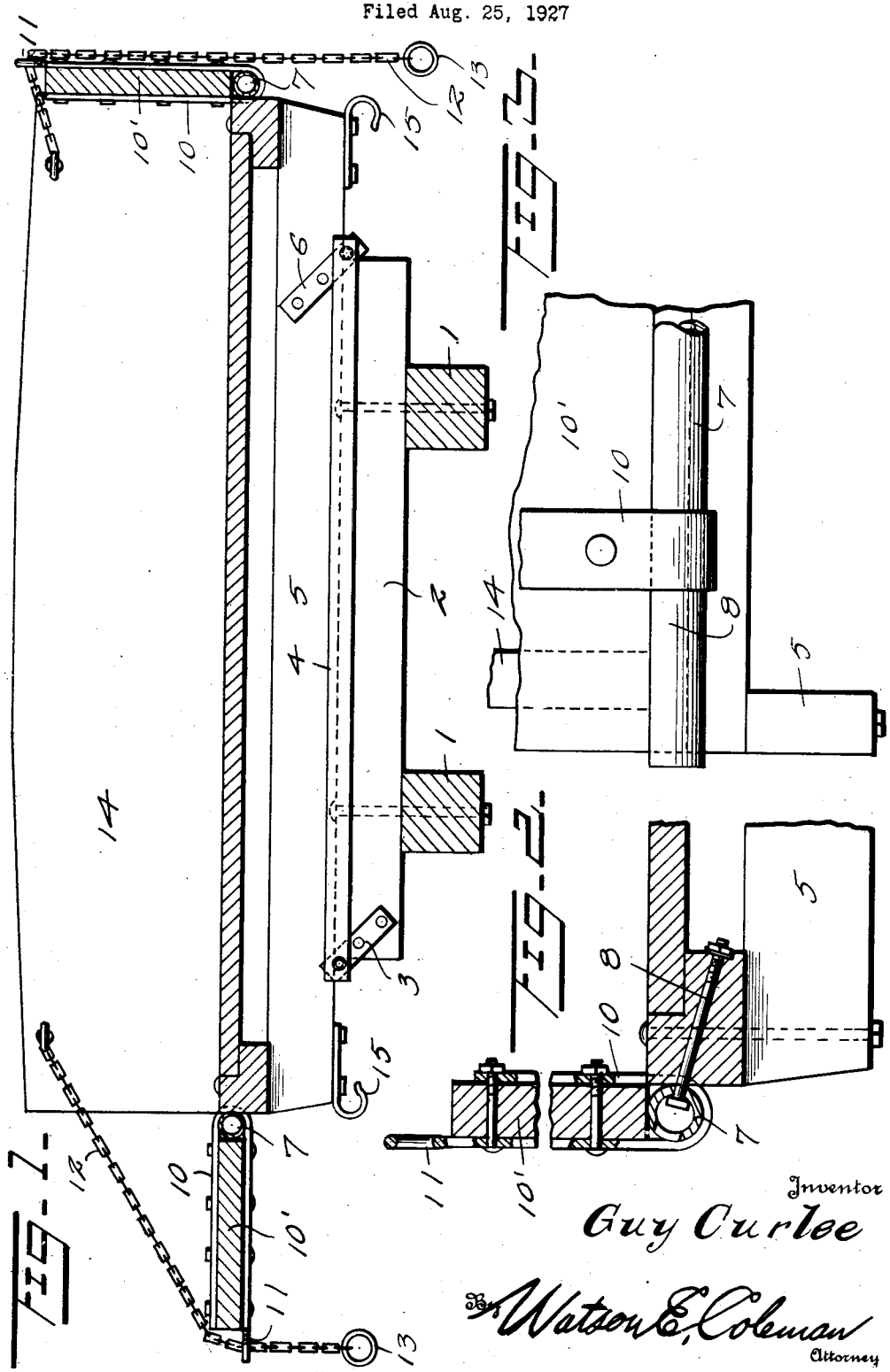

1,721,616

UNITED STATES PATENT OFFICE.

GUY CURLEE, OF STERLING, COLORADO.

SIDE-DUMP VEHICLE BED.

Application filed August 25, 1927. Serial No. 215,445.

This invention relates to a side dump vehicle bed and which consists in the novel features hereinafter described and claimed.

An object of the invention is to provide a vehicle bed of the character stated especially adapted to be used upon the frame of an automobile or wagon and having its parts and features so arranged and assembled that the bed may be tilted laterally whereby the load may be dumped at either side of the vehicle.

A further object of the invention is to provide in a side dumping bed of the character stated, means for effectually supporting the side panels of the bed, so that they may swing during the act of dumping and when vertically disposed above the floor of the bed, will retain the contents thereon and prevent the material which is carried upon the floor of the bed from sifting through the joint between the floor of the bed and said side panels.

In the drawing:—

Figure 1 is a transverse sectional view of the bed;

Figure 2 is a fragmentary enlarged sectional view thereof;

Figure 3 is a fragmentary plan view thereof.

As shown in the accompanying drawing, the side dump vehicle bed comprises beams 1 spaced from each other and adapted to be placed upon the frame of an automobile machine in a suitable manner. Transversely disposed sills 2 are mounted upon the upper surfaces of the beams 1 and the said sills are provided at one end portion with upstanding lugs 3. Bars 4 are pivotally connected at one end with the upwardly projecting portions of the lugs 3. Floor joists 5 are disposed above the sills 2 and are provided in the vicinity of one end with downwardly disposed lugs 6. The other ends of the bars 4 are pivotally connected with the lower portions of the lugs 6, so that the bars 4 lie in planes at the side surfaces of the sills 2 and the floor joists 5 whereby the said joists may lie flat upon the upper surfaces of the sills.

Pipe sections 7 are disposed along the side edges of the floor and are held by means of bolts 8 which have their heads enclosed within the pipe sections and which pass transversely through the side edge portions of the floor. Hinge straps 10 pass around the intermediate portions of the pipe sections 7 and carry side panels 10'. Eyes 11 are mounted at the end portions of the panels 10' and are disposed beyond the outer edges thereof. Chain sections 12 are threaded through the eyes 11 and are provided at their outer ends with rings 13 which are greater in diameter than the internal diameter of the eyes 11. Thus, the chain sections may move longitudinally through the eyes, but are prevented from becoming completely detached therefrom by the rings 13. The inner ends of the chain sections 12 are secured to the end portions of end panels 14, which are mounted upon the floor.

When the parts are at normal positions, the floor joists 5 rest flat upon the sills and the side panels 10' are held in vertical positions at the side edges of the floor and with their lower edges in close contact with the edges of the floor. Thus, the structure is rigid and tight and the side panels are held close against the edges of the floor throughout the length of the bed. This prevents the material from sifting from the floor and under the lower edges of the side panels. The side panels are reinforced by the shanks of the eyes which pass transversely across the same. The side panels may swing to any desired angle with relation to the plane of the floor and at the same time maintain a tight joint at the edge of the floor, thus saving waste or allowing any material which is carried upon the floor to sift between the edges of the floor and the side panels. The bed may be used for carrying sand, soft coal, grain or any other fine granular material without waste.

When it is desired to dump the load at one side of the vehicle, the bed is tilted laterally by using the pivotal connections between the bars 4 and the lugs 3 as fulcrum points. When it is desired to deposit the load at the opposite side of the vehicle, the bed is tilted by using the pivotal connections between the bar 4 and the lugs 6 as fulcrum points. Certain of the floor joists 5 are provided with hooks 15, to which lifting chains may be connected so that one side or the other of the bed may be hoisted, thereby dumping the contents into a hopper or railway car, as the case may be. The hooks also may be used for supporting a chute (not shown) which may be utilized to direct material into a bin or receptacle located a distance from the side of the vehicle.

Having described the invention, what is claimed is:

In a vehicle bed, pipe sections extending along the side edges of the vehicle bed, bolts passing through the pipe sections and securing the pipe sections to the vehicle bed and having their heads enclosed within the pipe sections, hinge straps passing around the pipe sections, and side panels carried by the hinge straps.

In testimony whereof I hereunto affix my signature.

GUY CURLEE.